March 22, 1960 P. F. HAYNER 2,929,362
DIFFERENTIAL HYDRAULIC VALVE
Filed Aug. 26, 1954 2 Sheets-Sheet 1

PAUL F. HAYNER
*INVENTOR.*

BY
ATTORNEY

March 22, 1960
P. F. HAYNER
2,929,362
DIFFERENTIAL HYDRAULIC VALVE
Filed Aug. 26, 1954
2 Sheets-Sheet 2
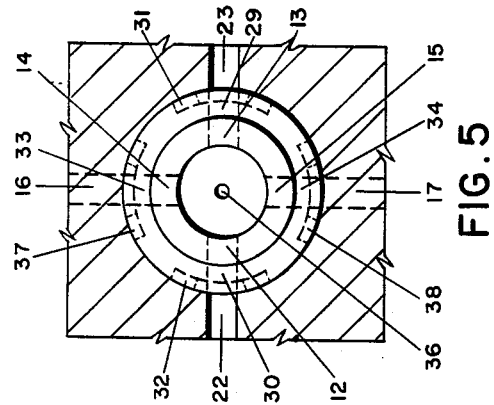
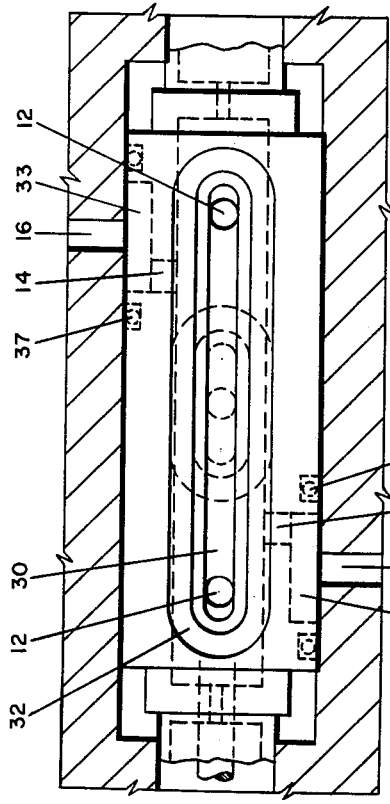
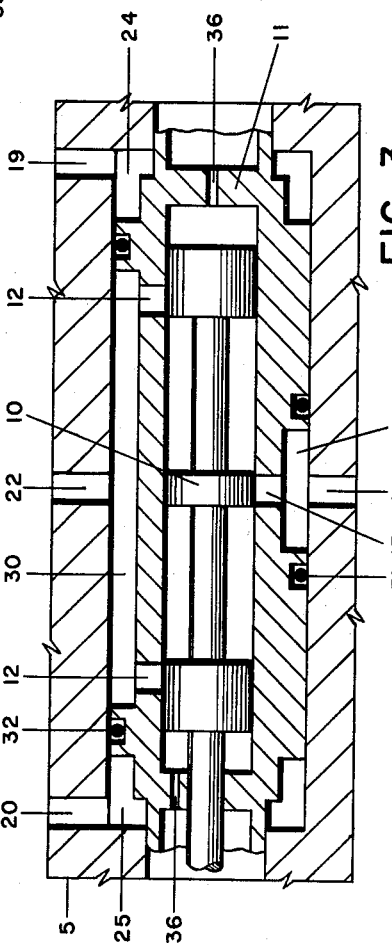
PAUL F. HAYNER
*INVENTOR.*
BY
ATTORNEY United States Patent Office 2,929,362
Patented Mar. 22, 1960

2,929,362

DIFFERENTIAL HYDRAULIC VALVE

Paul F. Hayner, Nashua, N.H., assignor, by mesne assignments, to Sanders Associates, Incorporated, Nashua, N.H., a corporation of Delaware Application August 26, 1954, Serial No. 452,376

3 Claims. (Cl. 121—41)

The present invention relates to automatic flight control apparatus. More particularly, the invention relates to hydraulic servo mechanisms such as are used in flight control apparatus.

In aircraft flight control apparatus the craft control surfaces are normally positioned by an automatic flight control system known in the art as an "autopilot." In many such systems of the prior art the control signals are electrical and operate hydraulic servo mechanisms to actuate the aircraft control surfaces in accordance with indications from the autopilot. Since the automatic system is subject to failures, the pilot often has need for assuming immediate control; the system must be so designed so as to enable the pilot also to control the craft manually when desired.

A considerable force is required manually to move the craft control surfaces, such as elevator and rudder surfaces, directly. Under normal operation the pilot effects manual control of the craft through an hydraulic amplifier system.

For "fail-safe" operation in the event of failure in the electrical or hydraulic systems, or both, it may be seen that three conditions of operation are desirable: autopilot-electric-hydraulic control, manual-hydraulic control and manual control with direct mechanical coupling.

It is therefore an object of the present invention to provide an improved hydraulic valve responsive simultaneously to two independent control displacement forces.

A further object of the invention is to provide an improved electro-mechanical aircraft control system having independent automatic and manual controls.

Other and further objects of the invention will be apparent from the description of a preferred embodiment thereof, taken in connection with the following description and accompanying drawings.

In accordance with the present invention there is provided an improved differential hydraulic valve apparatus. The valve apparatus includes a movable valve body and a pressure responsive, reciprocating sleeve-valve disposed within and hydraulically coupled to the body. A control-valve is hydraulically coupled to the sleeve-valve and responsive to an input electrical control signal. Means are provided for positioning the sleeve-valve relative to the body. A reciprocating piston-valve is disposed within the sleeve-valve. Means are provided for positioning the piston-valve relative to the sleeve-valve. Input ports in the sleeve-valve and valve body connect a source of fluid to the interior of the sleeve, whereby relative motion between the sleeve-valve and piston-valve produces a differential displacement therebetween for selectively controlling the opening of the ports. An output actuator cylinder is disposed in the valve body. An output actuator piston is disposed in the cylinder and affixed to mechanical ground. Control ports in the cylinder and sleeve connect the interior of the cylinder to the interior of the sleeve-valve to produce motion of the valve body with respect to the actuator piston. Elongated, axially disposed cavities formed in the sleeve connect passageways for fluid flow through the ports. At least one of the cavities is axially substantially as long as the sleeve. The cavities are perimetrically separated, whereby a plurality of fluid passageways to the interior of the sleeve may be effected simultaneously while permitting axial travel of the sleeve relative to the cylinder. Degenerative feedback is provided by the motion of the valve body causing the sleeve-valve to move in opposition to its original displacement and restore the differential displacement between the piston-valve and the sleeve-valve to an equilibrium condition. Electrical feedback means couple the body and the sleeve-valve.

In one embodiment there is provided an independent manual control means mechanically coupled to the piston-valve for positioning the piston-valve relative to the sleeve-valve, whereby the electrical signal can be overridden to provide fail-safe action. Mechanical stops on the sleeve-valve and the piston-valve are so disposed with respect to the valve body to enable direct manual control of the position of the valve body by utilizing the independent manual control means to over-ride hydraulic control and provide fail-safe action.

In the accompanying drawings:

Fig. 3 is an enlarged, fragmentary, cross-sectional view showing details of the valve of Fig. 2;

Fig. 4 is an enlarged, fragmentary view partially in cross-section showing a plan view of the reciprocating sleeve assembly of the valve of Fig. 2; and Fig. 5 is an enlarged, partially cross-sectional, transverse view of the reciprocating sleeve assembly as shown in Fig. 4.

Figure 1:
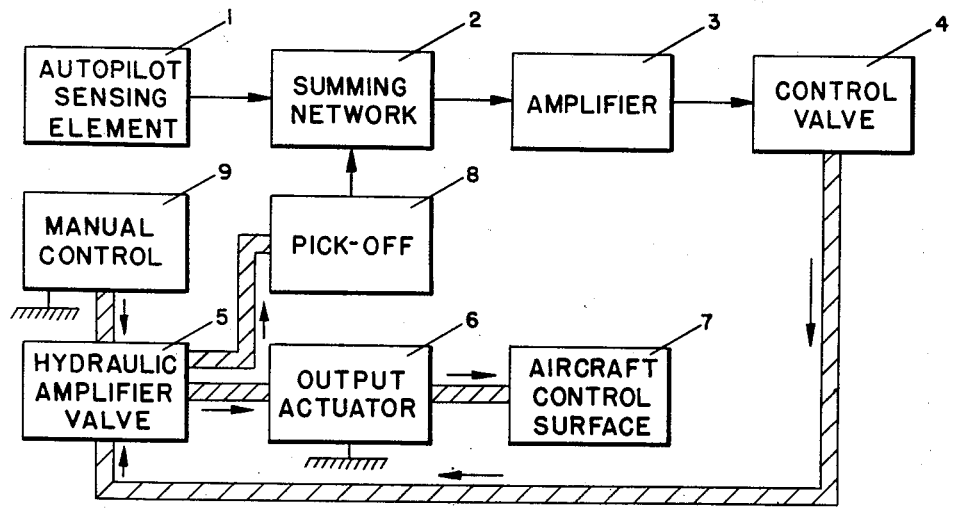
Fig. 1 is a block diagram of an autopilot system embodying the present invention.

Referring now to the drawings and with particular reference to Fig. 1 there is presented a functional block diagram of an electro-mechanical autopilot system such as is used in the guidance control of aircraft. The arrows in the diagram refer to the direction of control; the cross-hatched sections are hydraulic or mechanical control links and the heavy black lines are electrical control links.

In this system, for example, in accordance with a predetermined set of flight instructions, an autopilot sensing element 1, such as a gyro compass, provides an electric control signal to a summing network 2. The network 2 effects in its output, which is coupled to an amplifier 3, the algebraic sum of the output of the autopilot sensing element and a feedback error signal, as hereinafter described. The amplified control signal at the output of the amplifier 3 electrically operates, for example, by means of a solenoid torque motor, to position a piston of a control valve 4.

The valve 4 functions as a hydraulic amplifier. That is, a relatively small electrical input is translated thereby into a powerful flow of hydraulic fluid in the output of this valve.

The valve 4 is mechanically and hydraulically connected to the hydraulic amplifier valve 5, with an hydraulic coupling to a sleeve surrounding a piston of the valve 5. A control valve and solenoid torque motor of the type used herein is disclosed in applicant's copending application, Serial No. 404,684, filed January 18, 1954, entitled "Hydraulic Valve," now abandoned. The piston of the valve 5 is mechanically coupled to a manual control stick 9. The valve 5 is hydraulically coupled to a piston of an output actuator 6. The piston of the actuator 6 is hydraulically coupled to an aircraft control surface 7 such as a rudder or aileron. The motion of the piston of the output actuator 6 continues until such time as the electric signal at the input of the valve 4 is canceled. An electromechanical pick-off 8, such as a linear potentiometer having a variable tap, as hereinafter explained, produces a bias voltage to counteract the original deviation control signal in response to the relative motion of the body of the valve 5 and its sleeve, as presently more fully described.

The manual control 9 is coupled to the piston of the valve 5 as described above, and effects a flow of fluid in the output of the valve 5 which is proportional to the algebraic sum of the displacements provided by the control 9 and the valve 4. In practice, the manual control 9 may over-ride the action of the valve 4 and becomes controlling. The manual control 9, the control valve 4, the hydraulic amplifier valve 5, the output actuator 6 and the control surface 7 are connected together hydraulically and mechanically relative to mechanical ground through a common valve body as shown in Fig. 2 to enable direct manual control of the position of the surface 7.

Figure 2:
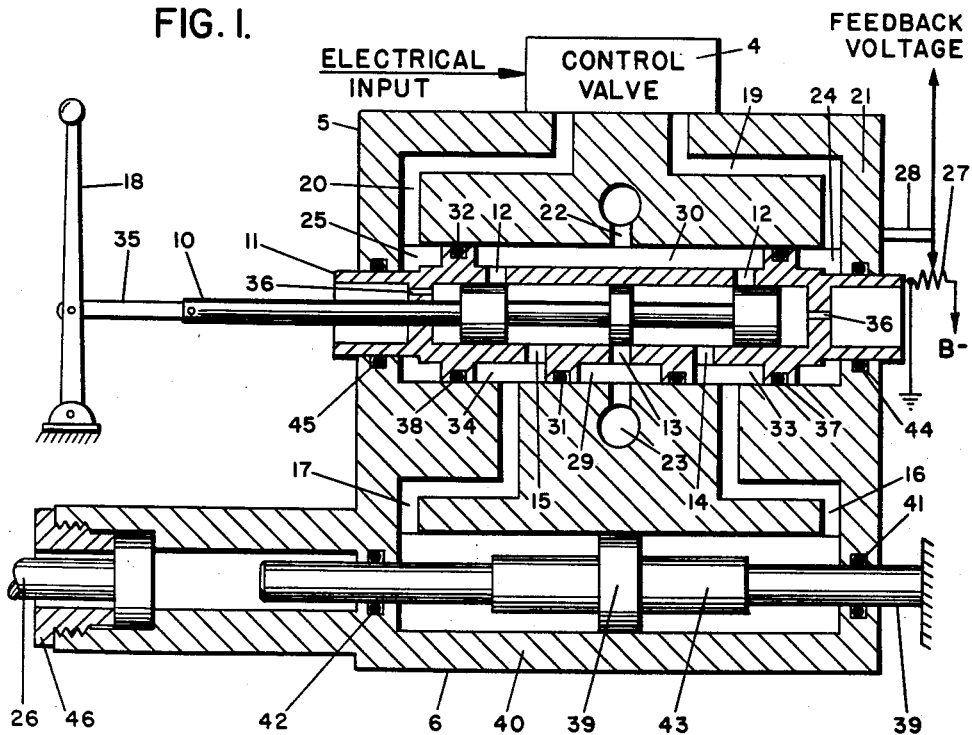
Fig. 2 is a simplified, partially schematic, cross-sectional view of a valve embodying the present invention.

Referring now to Fig. 2, the manual control comprises a lever 18 which is mechanically grounded as shown. The control valve 4 is shown schematically as hydraulically connected to the hydraulic amplifier 5 through conduits 19 and 20. The valve 5 comprises a cylinder 21, a reciprocating sleeve 11 and a reciprocating piston 10. Annular O rings 44 and 45 (fashioned, for example, of neoprene) hydraulically seal the sleeve 11 as shown. A pressure port 23 and an exhaust port 22 connect the valve 5 to a source of hydraulic fluid under pressure and to exhaust. The ports 22 and 23 are connected through manifolds 30 and 29 to the ports 12 and 13, respectively, of the sleeve 11. The manifolds 29 and 30 are hydraulically sealed by longitudinal O rings 31 and 32, respectively. The conduits 19 and 20 are connected to annular chambers 24 and 25 to position the sleeve 11. The interior of the sleeve is connected through control ports 14 and 15, and manifolds 33 and 34 in the sleeve to control passageways 16 and 17, respectively, of the output actuator 6. The manifolds 33 and 34 are hydraulically sealed by O rings 37 and 38, respectively. The manifolds 29, 33 and 34 are shown here schematically only; hence, the portions of the O rings 37 and 38 do not appear. Their actual physical positions are shown in detail in Figs. 3, 4 and 5. Vent ports 36 permit free motion of the piston 10 within the sleeve 11. The manual control lever 18 is coupled as shown through a rod 35 to the piston 10.

The actuator 6 comprises a piston 39 and a cylinder 40. Stops 43 are disposed on either side of the piston land. The actuator 6 is mechanically connected to a lever 26 which is coupled to the aircraft control surface 7. A land of the lever 26 is held in fixed connection to the actuator 6 by a threaded retainer 46. Annular O rings 41 and 42 hydraulically seal the piston 39 as shown.

The pick-off in the embodiment shown comprises a linear potentiometer 27 which is mechanically affixed to the sleeve 11, as shown. One side of the potentiometer is connected to electrical ground and the other side to a source of negative voltage indicated as B—. A tap on the potentiometer 27 is caused to vary by an extension 28 affixed to the amplifier 5 to produce a feedback bias voltage directly proportional to the displacement of the actuator cylinder 21 relative to the sleeve 11.

Referring now to Figs. 3, 4 and 5, the construction of the valve which permits relatively large displacements between the sleeve 11 and the cylinder 21, while maintaining hydraulic connections therethrough, is here illustrated. Longitudinal cavities such as the pressure manifold 29 and exhaust manifold 30 are formed in the sleeve 11 as shown. The manifolds 29 and 30 are connected to the pressure port 23 and exhaust port 22, respectively. The manifolds are hydraulically sealed by longitudinal O rings 31 and 32. Manifolds 33 and 34, as shown in Figs. 4 and 5, provide the hydraulic connections for control ports 14 and 15 and control passageways 16 and 17, respectively.

The operation of the preferred embodiment will now be described with particular reference to Fig. 2. A solenoid torque motor as shown, for example, in applicant's copending application as mentioned above is energized by an electric control signal derived from either the autopilot sensing element or as produced by the motion of the sleeve 11 relative to the cylinder 21. The valve 4 effects selective application of pressure or exhaust through the conduits 19 and 20 to the annular chambers 24 and 25 surrounding the sleeve 11. The application of fluid under pressure to the chamber 24 and exhaust to the chamber 25 causes the sleeve 11 to be displaced to the left relative to the cylinder 21. The pressure port 13 is then opened to apply fluid under pressure through the control port 15, control manifold 34 and passageway 17 to the left side (as shown) of the land of the actuator piston 39. The right exhaust port 12 (as shown) is opened to permit exhaust through the control port 14, control manifold 33 and passageway 16 from the right side of the piston land. Since the piston 39 is mechanically grounded, as shown, the amplifier cylinder 21 and actuator cylinder 40 (being integral) move together to the left. The lever 26, which is mechanically coupled to the aircraft control surface and the cylinder 40, accordingly moves to the left as well. The sleeve 11 also moves to the left tending to occlude the ports 12 and 13. Displacement of the sleeve 11 relative to the cylinder 21 effects a proportionate feedback voltage output from the potentiometer 27, as described above, to cancel the effects of the initiating control signal.

An input electrical control signal of the opposite polarity to that just referred to of the valve 4, effects the application of pressure through the conduit 20 to the chamber 25 to cause the sleeve 11 to be displaced to the right. Fluid under pressure is thereby connected through the pressure port 13 to the control port 14, control manifold 33 and passageway 16 to the right side of the land of the actuator piston 18. The cylinder 40 thereby moves to the right and actuates the aircraft control surface accordingly through the lever 26.

If the pilot desires to assume manual control, motion of the lever 18 effects direction mechanical control of the position of the amplifier piston 10 and adds algebraically to the displacements of the sleeve 11. In this condition, manual control is combined with hydraulic amplification and is operative in the event of an electrical failure.

Should there be a failure of the hydraulic system, the piston 10 may be displaced to the extreme right or to the extreme left to contact the sleeve 11 and transmit mechanical forces through the fluid in the chambers 24 and 25 to effect direct mechanical coupling and control of the aircraft control surface through the lever 26. In other embodiments, a biasing system may be added coupling the sleeve 11 to the valve 5 and adapted to restore the sleeve 11 to its neutral position and locked in place. This would eliminate the mechanical slack existing between the sleeve 11 and the valve 5.

From the above description it may be seen that the present invention provides a differential hydraulic amplifier, whereby independent displacement forces acting on the piston and the sleeve add algebraically to effect a controlling flow of fluid in an output actuator device.

The present invention provides a system having a substantially reduced and simplified structure of exceedingly dependable operability over the prior art.

As described above, the amplifier valve of this invention enhances the art of hydraulic control. Valves embodying the present invention are substantially more flexible as well as particularly adaptable to fail-safe operation.

While there has been hereinbefore described what is at present considered a preferred embodiment of the invention, it will be apparent that many and various changes and modifications may be made with respect to the embodiment illustrated, without departing from the spirit of the invention. It will be understood, therefore, that all those changes and modifications as fall fairly within the scope of the present invention, as defined in the appended claims, are to be considered as a part of the present invention.

What is claimed is:

1. A differential hydraulic valve apparatus, comprising: a movable valve body; a pressure responsive, reciprocating sleeve-valve disposed within and hydraulically coupled to said body; a control-valve hydraulically coupled to said sleeve-valve and responsive to an input electrical control signal; means for positioning said sleeve-valve relative said said body; a reciprocating piston-valve disposed within said sleeve-valve; means for positioning said piston-valve relative to said sleeve-valve; input ports in said sleeve-valve and valve body for connecting a source of fluid to the interior of said sleeve, whereby relative motion between said sleeve-valve and piston-valve produces a differential displacement therebetween for selectively controlling the opening of said ports; an output actuator cylinder disposed in said valve body; an output actuator piston disposed in said cylinder and affixed to mechanical ground; control ports in said cylinder and sleeve for connecting the interior of said cylinder to the interior of said sleeve-valve to produce motion of said valve body with respect to said actuator piston; elongated, axially disposed cavities formed in said sleeve providing connecting passageways for fluid flow through said ports, at least one of said cavities being axially substantially as long as said sleeve, said cavities being perimetrically separated, whereby a plurality of fluid passageways to the interior of said sleeve may be affected simultaneously while permitting axial travel of said sleeve relative to said cylinder, degenerative feedback being provided by the motion of said valve body causing said sleeve-valve to move in opposition to its original displacement and restore the differential displacement between said piston-valve and said sleeve-valve to an equilibrium condition; and electrical feedback means coupling said body and said sleeve-valve.

2. A differential hydraulic valve apparatus, comprising: a movable valve body; a pressure responsive, reciprocating sleeve-valve disposed within and hydraulically coupled to said body; a control-valve hydraulically coupled to said sleeve-valve and responsive to an input electrical control signal; means for positioning said sleeve-valve relative to said body; a reciprocating piston-valve disposed within said sleeve-valve; independent manual control means mechanically coupled to said piston-valve for positioning said piston-valve relative to said sleeve-valve, whereby said electrical signal can be over-ridden to provide fail-safe action; input ports in said sleeve-valve and valve body for connecting a source of fluid to the interior of said sleeve, whereby relative motion between said sleeve-valve and piston-valve produces a differential displacement therebetween for selectively controlling the opening of said ports; an output actuator cylinder disposed in said valve body; an output actuator piston disposed in said cylinder and affixed to mechanical ground; control parts in said cylinder and sleeve for connecting the interior of said cylinder to the interior of said sleeve-valve to produce motion of said valve body with respect to said actuator piston; elongated, axially disposed cavities formed in said sleeve providing connecting passageways for fluid flow through said ports, at least one of said cavities being axially substantially as long as said sleeve, said cavitie being perimetrically separated, whereby a plurality of fluid passageways to the interior of said sleeve may be affected simultaneously while permitting axial travel of said sleeve relative to said cylinder, degenerative feedback being provided by the motion of said valve body causing said sleeve valve to move in opposition to its original displacement and restore the differential displacement between said piston-valve and said sleeve-valve to an equilibrium condition; and electrical feedback means coupling said body and said sleeve-valve.

3. A differential hydraulic valve apparatus, comprising: a movable valve body; a pressure responsive, reciprocating sleeve-valve disposed within and hydraulically coupled to said body; a control-valve hydraulically coupled to said sleeve-value and responsive to an input electrical control signal; means for positioning said sleeve-valve relative to said body; a reciprocating piston-valve disposed within said sleeve-valve; independent manual control means mechanically coupled to said piston-valve for positioning said piston-valve relative to said sleeve-valve, whereby said electrical signal can be over-ridden to provide fail-safe action; input ports in said sleeve-valve and valve body for connecting a source of fluid to the interior of said sleeve, whereby relative motion between said sleeve-valve and piston-valve produces a differential displacement therebetween for selectively controlling the opening of said ports; an output actuator cylinder disposed in said valve body; an output actuator piston disposed in said cylinder and affixed to mechanical ground; control ports in said cylinder and sleeve for connecting the interior of said cylinder to the interior of said sleeve-valve to produce motion of said valve body with respect to said actuator piston; elongated, axially disposed cavities formed in said sleeve providing connecting passageways for fluid flow through said ports, at least one of said cavities being axially substantially as long as said sleeve, said cavities being perimetrically separated, whereby a plurality of fluid passageways to the interior of said sleeve may be affected simultaneously while permitting axial travel of said sleeve relative to said cylinder, degenerative feedback being provided by the motion of said valve body causing said sleeve-valve to move in opposition to its original displacement and restore the differential displacement between said piston-valve and said sleeve-valve to an equilibrium condition; electrical feedback means coupling said body and said sleeve-valve; and mechanical stops on said sleeve-valve and said piston-valve so disposed with respect to said valve body as to enable direct manual control of the position of said valve body by utilizing said independent manual control means to override hydraulic control and provide fail-safe action.

References Cited in the file of this patent

UNITED STATES PATENTS

| | | |
|---|---|---|
| 991,950 | Carroll | May 9, 1911 |
| 2,396,951 | Horstmann | Mar. 19, 1946 |
| 2,486,816 | Beeh | Nov. 1, 1949 |
| 2,579,028 | Baldwin | Dec. 18, 1951 |
| 2,678,177 | Chenery et al. | May 11, 1954 |
| 2,773,660 | Rasmussen | Dec. 11, 1956 |

FOREIGN PATENTS

| | | |
|---|---|---|
| 612,163 | France | July 26, 1926 |